United States Patent
Dauerer et al.

(10) Patent No.: US 6,205,454 B1
(45) Date of Patent: Mar. 20, 2001

(54) WEB BROWSER ROW CONTROL

(75) Inventors: Norman J. Dauerer, Hopewell Junction; Edward E. Kelley, Wappingers Falls; Franco Motika, Hopewell Junction, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/879,717

(22) Filed: Jun. 20, 1997

(51) Int. Cl.[7] ............................. G06F 17/21; G06F 17/30
(52) U.S. Cl. ............................. 707/513; 707/526
(58) Field of Search .................... 707/513, 500–505, 707/509, 526; 709/201–203; 345/339, 341, 342, 345, 352, 353

(56) References Cited

U.S. PATENT DOCUMENTS

| | | |
|---|---|---|
| 5,142,669 * | 8/1992 | Inoue et al. ................... 395/157 |
| 5,291,602 | 3/1994 | Barker et al. . |
| 5,299,304 | 3/1994 | Williams et al. . |
| 5,499,329 | 3/1996 | Motoyama et al. . |
| 5,530,852 | 6/1996 | Meske, Jr. et al. . |
| 5,623,679 * | 4/1997 | Rivette et al. ................. 707/526 |

OTHER PUBLICATIONS

Morgan, Mike, Developing for Netscape one, Que, pp. 85–89, 440 and 471, Jan. 1997.*

* cited by examiner

Primary Examiner—Joseph H. Feild
Assistant Examiner—Alford W. Kindred
(74) Attorney, Agent, or Firm—DeLio & Peterson, LLC; Peter W. Peterson; Aziz M. Ahsan

(57) ABSTRACT

The present invention is a process for visually organizing multiple information and headings on a computer screen of a Web browser. A single file containing data and integrated headings is translated by a Web browser. Hypertext markup language is used to control the integrated headings determining which headings are scrollable or non-scrollable. Top and bottom headings are non-scrollable. Scrollable middle headings scroll with the data and replace top headings when they reach the top of the screen.

23 Claims, 13 Drawing Sheets

|         | Personal Information | | | |
| Name | Street Address | City | State | Phone Number |
| --- | --- | --- | --- | --- |
| John Doe | 9 Oak | Springfield | NY | 914-895-0345 |
| Tom Smith | 10 Elm | Oak Ridge | Ma | 693-654-0234 |
| Joe Jones | 5 Case | Pittsburg | Pa | 789-361-9574 |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

FIG. 1 (Prior Art)

| any name | any street | any town | any | any phone |
| --- | --- | --- | --- | --- |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

FIG. 2 (Prior Art)

| | Personal Information | | | |
|---|---|---|---|---|
| Name | Street Address | City | State | Phone Number |
| Joe Jones | 5 Case | Pittsburg | Pa | 789-361-9574 |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

FIG. 3 (Prior Art)

| any name | any street | any town | any | any phone |
|---|---|---|---|---|
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

| | Additional Personal Information | |
|---|---|---|
| Occupation | Date of Birth | Education |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |

| Personal Information | | | | |
|---|---|---|---|---|
| Name | Street Address | City | State | Phone Number |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

| Additional Personal Informtion | | |
|---|---|---|
| Occupation | Date of Birth | Education |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |

FIG. 6

| PERSONAL INFORMATION | | | | |
|---|---|---|---|---|
| Name | Street Address | City | State | Phone Number |

| Additional Personal Informtion | | |
|---|---|---|
| Occupation | Date of Birth | Education |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |

| Occupation | Additional Personal Information Date of Birth | Education |
|---|---|---|
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |

FIG. 7

```
<html>
<body>
<pre>
<top scroll>           Personal Information
Name            Street Address      City        State   Phone number
----            --------            ------              -----</top scroll>
John Doe        9 Oak               Springfield  NY     914-895-0345
Tom Smith       10 Elm              Oak Ridge    Ma     693-654-0234
Joe Jones       5 Case              Pittsburg    Pa     789-361-9574
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
any name        any street          any town     any    any phone
<middle scroll>                     Additional Personal Information
Occupation      Date of Birth       Education
----------      -------------       ---------</middle scroll>
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
xxxxxxxx        yy/mm/dd            yyyyyyyyyyyyyyyyyyyyyyyyy
<bot scroll>{IBM Homepage} {Microelectronics Homepage} {Lotus Homepage}
{Local Homepage} {Forward} {Backward}</bot scroll>
</pre>
</body>
</html>
```

FIG. 9

|    |    |          | Personal Information |          |       |              |
|----|----|----------|----------------------|----------|-------|--------------|
| 1  | 1  |          |                      |          |       |              |
| 2  | 2  | Name     | Street Address       | City     | State | Phone Number |
| 3  | 3  | ---      | -------              | ----     | --    | -----        |
| 4  | 4  | John Doe | 9 Oak                | Springfield | NY | 914-895-0345 |
| 5  | 5  | Tom Smith | 10 Elm              | Oak Ridge | Ma  | 693-654-0234 |
| 6  | 6  | Joe Jones | 5 Case              | Pittsburge | Pa | 789-361-9574 |
| 7  | 7  | any name | any street           | any town | any   | any phone    |
| 8  | 8  | any name | any street           | any town | any   | any phone    |
| 9  | 9  | any name | any street           | any town | any   | any phone    |
| 10 | 10 | any name | any street           | any town | any   | any phone    |
| 11 | 11 | any name | any street           | any town | any   | any phone    |
| 12 | 12 | any name | any street           | any town | any   | any phone    |
| 13 | 13 | any name | any street           | any town | any   | any phone    |
| 14 | 14 | any name | any street           | any town | any   | any phone    |
| 15 | 15 | any name | any street           | any town | any   | any phone    |
| 16 | 16 | any name | any street           | any town | any   | any phone    |
| 17 | 17 | any name | any street           | any town | any   | any phone    |
| 18 | 18 | any name | any street           | any town | any   | any phone    |
| 19 | 52 | {IBM Homepage} {Microelctronics Homepage} {Lotus Homepage} | | | | |
| 20 | 53 | {Local Homepage} {Forward} {Backward} | | | | |

FIG. 10

|   |   |      | Personal Information |      |       |              |
|---|---|------|----------------------|------|-------|--------------|
| 1 | 1 |      |                      |      |       |              |
| 2 | 2 | Name | Street Address       | City | State | Phone Number |
| 3 | 3 | ---  | -----                | --   | --    | ------       |

```
1               Personal Information
2    Name          Street Address     City        State   Phone Number
3    ---           ---                ---         ---     ---
4    John Doe      9 Oak              Springfield NY      914-895-0345
5    Tom Smith     10 Elm             Oak Ridge   Ma      693-654-0234
6    Joe Jones     5 Case             Pittsburg   Pa      789-361-9574
7    any name      any street         any town    any     any phone
8    any name      any street         any town    any     any phone
9    any name      any street         any town    any     any phone
10   any name      any street         any town    any     any phone
11   any name      any street         any town    any     any phone
12   any name      any street         any town    any     any phone
13   any name      any street         any town    any     any phone
14   any name      any street         any town    any     any phone
15   any name      any street         any town    any     any phone
16   any name      any street         any town    any     any phone
17   any name      any street         any town    any     any phone
18   any name      any street         any town    any     any phone
19   any name      any street         any town    any     any phone
20   any name      any street         any town    any     any phone
21   any name      any street         any town    any     any phone
22   any name      any street         any town    any     any phone
23   any name      any street         any town    any     any phone
24                             Additional Personal Information
25   Occupation    Date of Birth      Education
26   ---           ---                ---
27   xxxxxxxx      yy/mm/dd           yyyyyyyyyyyyyyyyyyyyyyyyyy
28   xxxxxxxx      yy/mm/dd           yyyyyyyyyyyyyyyyyyyyyyyyyy
29   xxxxxxxx      yy/mm/dd           yyyyyyyyyyyyyyyyyyyyyyyyyy
30   xxxxxxxx      yy/mm/dd           yyyyyyyyyyyyyyyyyyyyyyyyyy
31   xxxxxxxx      yy/mm/dd           yyyyyyyyyyyyyyyyyyyyyyyyyy
32   xxxxxxxx      yy/mm/dd           yyyyyyyyyyyyyyyyyyyyyyyyyy
33   xxxxxxxx      yy/mm/dd           yyyyyyyyyyyyyyyyyyyyyyyyyy
34   xxxxxxxx      yy/mm/dd           yyyyyyyyyyyyyyyyyyyyyyyyyy
35   xxxxxxxx      yy/mm/dd           yyyyyyyyyyyyyyyyyyyyyyyyyy
36   xxxxxxxx      yy/mm/dd           yyyyyyyyyyyyyyyyyyyyyyyyyy
37   xxxxxxxx      yy/mm/dd           yyyyyyyyyyyyyyyyyyyyyyyyyy
38   xxxxxxxx      yy/mm/dd           yyyyyyyyyyyyyyyyyyyyyyyyyy
39   xxxxxxxx      yy/mm/dd           yyyyyyyyyyyyyyyyyyyyyyyyyy
40   xxxxxxxx      yy/mm/dd           yyyyyyyyyyyyyyyyyyyyyyyyyy
41   xxxxxxxx      yy/mm/dd           yyyyyyyyyyyyyyyyyyyyyyyyyy
42   xxxxxxxx      yy/mm/dd           yyyyyyyyyyyyyyyyyyyyyyyyyy
43   xxxxxxxx      yy/mm/dd           yyyyyyyyyyyyyyyyyyyyyyyyyy
44   xxxxxxxx      yy/mm/dd           yyyyyyyyyyyyyyyyyyyyyyyyyy
45   xxxxxxxx      yy/mm/dd           yyyyyyyyyyyyyyyyyyyyyyyyyy
46   xxxxxxxx      yy/mm/dd           yyyyyyyyyyyyyyyyyyyyyyyyyy
47   xxxxxxxx      yy/mm/dd           yyyyyyyyyyyyyyyyyyyyyyyyyy
48   xxxxxxxx      yy/mm/dd           yyyyyyyyyyyyyyyyyyyyyyyyyy
49   xxxxxxxx      yy/mm/dd           yyyyyyyyyyyyyyyyyyyyyyyyyy
50   xxxxxxxx      yy/mm/dd           yyyyyyyyyyyyyyyyyyyyyyyyyy
51   xxxxxxxx      yy/mm/dd           yyyyyyyyyyyyyyyyyyyyyyyyyy
52   {IBM Homepage} {Microelectronics Homepage} {Lotus Homepage}
53   {Local Homepage} {Forward} {Backward}
```

FIG. 12                                                              40

```
1  1                  Personal Information
2  2      Name        Street Adress     City      State  Phone Number
3  3      ---         ---               ---       ---    ---
19 52 {IBM Homepage} {Microelectronics Homepage} {Lotus Homepage}
20 53 {Local Homepage} {Forward} {Backward}
```

FIG. 13                                                              36

|  | Personal Information | | | |
|---|---|---|---|---|
| Name | Street Address | City | State | Phone Number |
| John Doe | 9 Oak | Springfield | NY | 914-895-0345 |
| Tom Smith | 10 Elm | Oak Ridge | Ma | 693-654-0234 |
| Joe Jones | 5 Case | Pittsburg | Pa | 789-361-9574 |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |
| any name | any street | any town | any | any phone |

{IBM Homepage} {Microelectronics Homepage} {Lotus Homepage}
{Local Homepage} {Forward} {Backward}

FIG. 14

|  | Personal Information | | | |
|---|---|---|---|---|
| Name | Street Address | City | State | Phone Number |
|  | Additional Personal | Information | | |
| Occupation | Date of Birth | Education | | |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |
| xxxxxxx | yy/mm/dd | yyyyyyyyyyyyyyyyyyyyyyyyyy |

{IBM Homepage} {Microelectronics Homepage} {Lotus Homepage}
{Local Homepage} {Forward} {Backward}

FIG. 15

|     |     |                 | Personal Information |             |                    |
| --- | --- | --------------- | -------------------- | ----------- | ------------------ |
| 1   | 1   |                 | Personal Information |             |                    |
| 2   | 2   | Name            | Street Address       | City        | State Phone Number |
| 3   | 3   | ---             | ------               | --          | -- -----           |
| 4   | 24  |                 | Additional Personal  | Information |                    |
| 5   | 25  | Occupation      | Date of Birth        | Education   |                    |
| 6   | 26  | -----           | ------               | ----        |                    |
| 7   | 27  | xxxxxxx         | yy/mm/dd             | yyyyyyyyyyyyyyyyyyyyyyyyy | |
| 8   | 28  | xxxxxxx         | yy/mm/dd             | yyyyyyyyyyyyyyyyyyyyyyyyy | |
| 9   | 29  | xxxxxxx         | yy/mm/dd             | yyyyyyyyyyyyyyyyyyyyyyyyy | |
| 10  | 30  | xxxxxxx         | yy/mm/dd             | yyyyyyyyyyyyyyyyyyyyyyyyy | |
| 11  | 31  | xxxxxxx         | yy/mm/dd             | yyyyyyyyyyyyyyyyyyyyyyyyy | |
| 12  | 32  | xxxxxxx         | yy/mm/dd             | yyyyyyyyyyyyyyyyyyyyyyyyy | |
| 13  | 33  | xxxxxxx         | yy/mm/dd             | yyyyyyyyyyyyyyyyyyyyyyyyy | |
| 14  | 34  | xxxxxxx         | yy/mm/dd             | yyyyyyyyyyyyyyyyyyyyyyyyy | |
| 15  | 35  | xxxxxxx         | yy/mm/dd             | yyyyyyyyyyyyyyyyyyyyyyyyy | |
| 16  | 36  | xxxxxxx         | yy/mm/dd             | yyyyyyyyyyyyyyyyyyyyyyyyy | |
| 17  | 37  | xxxxxxx         | yy/mm/dd             | yyyyyyyyyyyyyyyyyyyyyyyyy | |
| 18  | 38  | xxxxxxx         | yy/mm/dd             | yyyyyyyyyyyyyyyyyyyyyyyyy | |
| 19  |     | {IBM Homepage} {Microelectronics Homepage} {Lotus Homepage} | | | |
| 20  |     | {Local Homepage} {Forward} {Backward} | | | |

FIG. 16

|     |     |                 | Additional Personal  | Information |     |
| --- | --- | --------------- | -------------------- | ----------- | --- |
| 1   | 24  |                 | Additional Personal  | Information |     |
| 2   | 25  | Occupation      | Date of Birth        | Education   |     |
| 3   | 26  | -----           | ------               | ----        |     |
| 4   | 27  | xxxxxxx         | yy/mm/dd             | yyyyyyyyyyyyyyyyyyyyyyyyy | |
| 5   | 28  | xxxxxxx         | yy/mm/dd             | yyyyyyyyyyyyyyyyyyyyyyyyy | |
| 6   | 29  | xxxxxxx         | yy/mm/dd             | yyyyyyyyyyyyyyyyyyyyyyyyy | |
| 7   | 30  | xxxxxxx         | yy/mm/dd             | yyyyyyyyyyyyyyyyyyyyyyyyy | |
| 8   | 31  | xxxxxxx         | yy/mm/dd             | yyyyyyyyyyyyyyyyyyyyyyyyy | |
| 9   | 32  | xxxxxxx         | yy/mm/dd             | yyyyyyyyyyyyyyyyyyyyyyyyy | |
| 10  | 33  | xxxxxxx         | yy/mm/dd             | yyyyyyyyyyyyyyyyyyyyyyyyy | |
| 11  | 34  | xxxxxxx         | yy/mm/dd             | yyyyyyyyyyyyyyyyyyyyyyyyy | |
| 12  | 35  | xxxxxxx         | yy/mm/dd             | yyyyyyyyyyyyyyyyyyyyyyyyy | |
| 13  | 36  | xxxxxxx         | yy/mm/dd             | yyyyyyyyyyyyyyyyyyyyyyyyy | |
| 14  | 37  | xxxxxxx         | yy/mm/dd             | yyyyyyyyyyyyyyyyyyyyyyyyy | |
| 15  | 38  | xxxxxxx         | yy/mm/dd             | yyyyyyyyyyyyyyyyyyyyyyyyy | |
| 16  | 39  | xxxxxxx         | yy/mm/dd             | yyyyyyyyyyyyyyyyyyyyyyyyy | |
| 17  | 40  | xxxxxxx         | yy/mm/dd             | yyyyyyyyyyyyyyyyyyyyyyyyy | |
| 18  | 41  | xxxxxxx         | yy/mm/dd             | yyyyyyyyyyyyyyyyyyyyyyyyy | |
| 19  | 52  | {IBM Homepage} {Microelectronics Homepage} {Lotus Homepage} | | | |
| 20  | 53  | {Local Homepage} {Forward} {Backward} | | | |

FIG. 17

|  | Additional Personal Information | |
| --- | --- | --- |
| Occupation | Date of Birth | Education |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |
| xxxxxxx | yy/mm/dd | yyyyyyyyyyyyyyyyyyyyyyyyyyy |

{IBM Homepage} {Microelectronics Homepage} {Lotus Homepage}
{Local Homepage} {Forward} {Backward}

WEB BROWSER ROW CONTROL

BACKGROUND OF THE INVENTION

1. Field of the Invention

The present invention relates to internet browsing software and more particularly to software for enhancing document display while browsing the internet.

2. Problem to be Solved

Current internet or Web browsers interpreting Hypertext Markup Language (HTML) are unable to display non-scrollable headings in files that are defined with HTML tags. For example, if there is a file with data and headings which define the data, the Web browser will scroll past the headings so that the headings are scrolled off of the screen and the user is left with data without descriptive headings. FIG. 1 illustrates the top half of an HTML file as it would be displayed on a computer monitor. The column headings are displayed at the top of the monitor. FIG. 2 illustrates the file of FIG. 1 as it is scrolled; the headings are no longer visible.

There is also a need to have sets of different non-scrollable headings in a file that contains different rows of data. FIGS. 3 and 4 illustrate files of related information which have several different sets of headings which describe different data.

Another problem is that current Web browsers cannot display a non-scrollable heading at the bottom of the computer screen. Bottom headings are generally used to display a group of options that might be used at anytime when a user is viewing an HTML file.

One solution which partially addresses the problem of non-scrollable headings is Frames, by Netscape. Frames require separate program files in order to compute top headings, a middle section and bottom headings. Frames also require special coding in the HTML source file to tie all of the frames together. Each frame is a window which is optionally scrolled. Frames does not address the problem of middle scrolls, nor does it provide one file that contains all of the non-scrollable headings and the body of the file.

Bearing in mind the problems and deficiencies of the prior art, it is therefore an object of the present invention to provide software for enhancing document display while browsing the internet whereby only one file for the HTML source code is needed.

It is another object of the present invention to provide a software for enhancing document display while browsing the internet whereby a heading displaying options would always be accessible.

It is a further object of the present invention to provide software for enhancing document display while browsing the internet which allows headings to be defined as non-scrollable so that the headings will always be visible as the data is scrolled.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a web browser enhancement for visually organizing multiple information and headings on a computer screen of a web browser comprising: a data file, said data file comprising integrated top, bottom, and middle headings for identifying data; a means for locking said top headings in a top screen position; a means for locking said bottom headings in a bottom screen position; and a means for movably positioning said middle heading between said top and bottom headings.

Another aspect of the present invention relates to a process for visually organizing multiple information and headings on a computer screen of a web browser comprising: (a) providing a data file, said data file comprising integrated top, bottom, and middle headings for identifying data; (b) locking said top headings in a top screen position using HTML tags; (c) locking said bottom headings in a bottom screen position using HTML tags; and (d) positioning said middle heading between said top and bottom headings using HTML tags.

In another aspect, the present invention relates to a process for visually organizing multiple information and headings on a computer screen of a web browser comprising: (a) providing a first heading for identifying data; (b) providing data associated with said first heading; (c) writing said first heading and data to the screen; (d) locking said first heading in a selected position using HTML tags; and (e) scrolling said data on the screen for viewing said data adjacent to said first heading while said first heading remains locked.

In another aspect, the present invention relates to a process for visually organizing multiple information and headings on a computer screen of a web browser comprising: (a) providing a data file with integrated scrollable and non-scrollable headings controlled using HTML tags; (b) reading said data file with a computing means; (c) computing the screen including said headings; and (d) writing said data and headings to the screen.

In another aspect, the present invention relates to a process for visually organizing multiple information and headings on a computer screen of a web browser comprising: (a) providing data with top, bottom and at least one middle integrated headings; (b) formatting scroll tags associated with said headings; (c) writing to a reserved table if a top scroll tag is present; (d) writing to said reserved table if a second scroll tag is present; (e) reading reserved table; (f) computing the screen; and (g) writing data to the screen.

In another aspect, the present invention relates to a process for visually organizing multiple information and headings on a computer screen of a web browser comprising: (a) providing data, said data comprising integrated top, bottom and middle horizontal headings controlled using HTML tags; (b) reading said data with a computer capable of reading said data; (c) writing said data and said top, bottom and middle headings to the screen; (d) locking said top heading in a top screen position using said HTML tags; (e) locking said bottom heading in a bottom screen position using said HTML tags; and (f) movably positioning said middle heading between said top and bottom headings using said HTML tags.

In another aspect, the present invention relates to a process for visually organizing multiple information and headings on a computer screen of a web browser comprising: (a) providing one data file with integrated headings including at least one scrollable middle heading; (b) translating said data file and headings into a computed screen with the web browser; (c) scrolling said middle heading to a top position on the computer screen; (d) translating said data file and headings into a computed screen with the web browser; and (e) locking said middle heading in the top screen position using HTML tags.

In another aspect, the present invention relates to a system for operating a programmable computer comprising: a storage medium; and a set of operating instructions recorded on said storage medium to be executed by a computer capable of reading said storage medium, said instructions enabling said computer to (a) read a data file with integrated scrollable and non-scrollable headings; and (b) write integrated headings and data to a computer screen.

In yet another aspect, the present invention relates to a program storage device readable by a machine, tangibly embodying a program of instructions executable by the machine to perform the method steps for visually organizing multiple information and headings on a computer screen of a web browser, said method steps comprising: (a) providing one data file with integrated headings including at least one scrollable middle heading; (b) translating said data file and headings into a computed screen with the web browser; (c) scrolling said middle heading to a top position on the computer screen; (d) translating said data file and headings into a computed screen with the web browser; and (e) locking said middle heading in the top screen position using HTML tags.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 illustrates a computed prior art HTML file as displayed, with top headings, on a computer monitor.

FIG. 2 illustrates the prior art HTML file of FIG. 1 with the top headings scrolled out of view.

FIG. 3 illustrates a display of prior art HTML file as displayed, with top headings, on a computer monitor.

FIG. 4 illustrates the prior art HTML file of FIG. 3 with the top headings scrolled out of view and middle headings scrolled into view.

FIG. 5 illustrates a computer monitor display of the present invention with the top heading locked in position and the middle heading scrollable to a position just below the top heading.

FIG. 6 illustrates a computer monitor display of FIG. 5 with top headings locked in position and middle headings scrolled to a top most screen position, adjacent to the top headings.

FIG. 7 illustrates a computer monitor display of the present invention with original middle heading locked in the top heading position.

FIG. 9 is a sample HTML source file for formatting scroll tags of step 101 of the flow chart of FIG. 8.

FIG. 10 is a reserved table of step 106 of the flow chart of FIG. 8.

FIG. 11 is an example of a reserved table.

FIG. 12 is a sample HTML file with absolute row numbers in the left column.

FIG. 13 is a reserved table of step 106 of the flow chart of FIG. 8.

FIG. 14 is an example of the computed screen as would be computed in steps 107 and 200 of the flow chart of FIG. 8.

FIG. 15 is an example computed screen of step 206 of the flow chart of FIG. 8 illustrating the middle scrollable heading adjacent to the top locked heading.

FIG. 16 is an example reserved table of step 206 of the flow chart of FIG. 8 illustrating the middle scrollable heading adjacent to the top locked heading.

FIG. 17 is a reserved table of step 300 of the flow chart of FIG. 8 illustrating the middle heading of FIG. 16 in the top heading position.

FIG. 18 is an example of the computed screen of step 303 of the flow chart of FIG. 8.

DESCRIPTION OF THE PREFERRED EMBODIMENT(S)

Figure 8A:
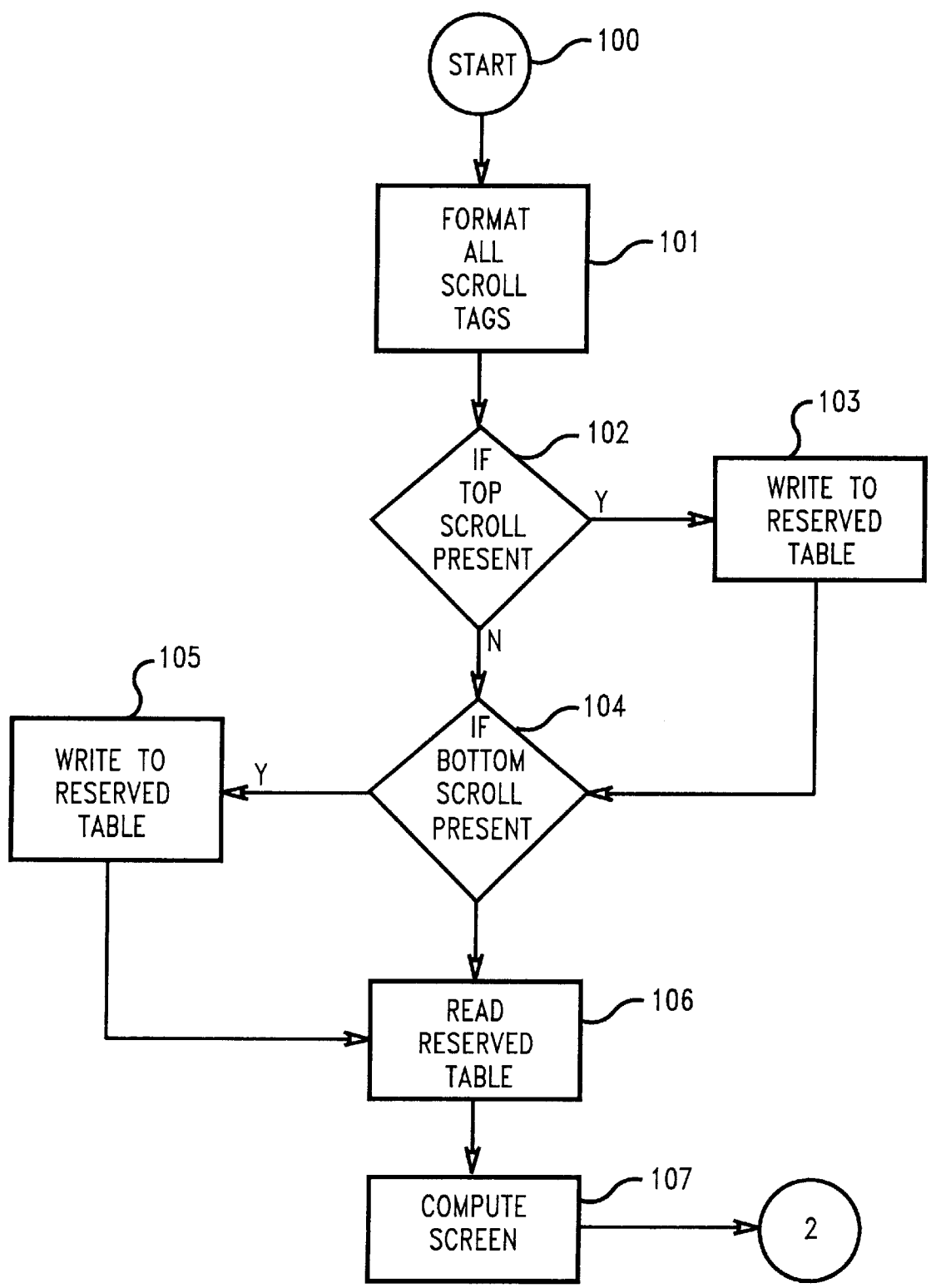
FIGS. 8a–c illustrate a flow chart representing steps 100 through 304 of the operation process of the present invention Web Browser Enhanced Row Control.

In describing the preferred embodiment of the present invention, reference will be made herein to FIGS. 1–18 of the drawings in which like numerals refer to like features of the invention. The terms top, bottom, middle have been used to describe placement of headings on a computer screen. These terms are used in their ordinary meanings to one of ordinary skill in the art. It is intended that this invention should not be limited to the particular language of the embodiments disclosed.

The following is a list of definitions for the terms used to describe the Web browser row control of the present invention:

| | |
|---|---|
| HTML | Hypertext Markup Language |
| HTML tag | HTML markup tags |
| HTML source file | File with the HTML tags to be converted by a Web browser and displayed on a monitor. |
| HTML file | File that has been formatted by the Web browser and will be displayed on a monitor. |
| Screen | Portion of the HTML file which a viewer sees when a Web browser displays the HTML file on the monitor. |
| Reserved Table | A table which contains the line numbers, the absolute row lines and the corresponding lines form the HTML file, the non-scrollable rows that are displayed on the screen. The table also contains the row positions of the non-scrollable rows on the screen. |
| Scroll tags | Set of HTML tags which define rows of data of an HTML source file which appear to be non-scrollable when displayed on a screen. |
| Top scroll | One or more rows from the HTML file which are locked in position at the top of the screen. |
| Bottom Scroll | One or more rows from the HTML file which are locked in position at the bottom of the screen. |
| Middle Scroll | One or more rows from the HTML file which are indicated to be locked in position when the top row of the Middle Scroll reaches the last row of the previously locked top Scroll on the screen. |
| Line Numbers | The numbers of each row of the screen. The line numbers begin at one and proceed in sequence to the last line that is to be written to the screen. |
| Absolute Row Lines | The numbers of each row of the HTML file. They start at one and proceed in sequence to the end of the HTML file. |
| Locked | One or more rows that do not move on the monitor when the screen presented by a Web browser is scrolled. |

| | -continued |
|---|---|
| Scroll HTML tags | HTML tags which control top, middle and bottom groups of rows that become non-scrollable. FIG. 7 illustrates non-scrollable top headings. |

The present invention changes the way Web browsers interact with Hypertext Markup Language (HTML) to allow for headings to be defined as non-scrollable so that the headings will always be visible as the data is scrolled. This can be accomplished by introducing a new set of HTML tags called scroll tags that identify the next "n" lines in a file as non-scrollable. The three types of scroll HTML tags are top, bottom and middle and each has corresponding end tags.

If a top scroll HTML tag is present, the Web browser automatically "locks" the rows indicated by the top scroll HTML tag at the top of the screen, regardless of the number of lines of data which are scrolled. The Web browser keeps track of the position of the line with the "scroll" HTML tag; when the line reached the top of the browser screen, the browser then locks the non-scrollable headings and scrolls data rows to the last non-scrollable heading. On the next move, the data rows disappear. The user sees rows of data scrolling on the screen, those rows look as though they are disappearing under the heading.

If a bottom scroll HTML tag is present, the Web browser automatically "locks" the rows indicated by the bottom scroll HTML tag at the bottom of the screen, regardless of the number of lines of data which are scrolled.

If a middle scroll HTML tag is present, the Web browser keeps track of the position with the middle scroll HTML tag. There are two conditions affecting the middle scroll HTML tag: 1) when there are no locked rows at the top of the screen; and 2) when there are locked rows at the top of the screen. When the no locked rows at the top of the screen condition is present, the top row of the group of rows marked by the middle scroll HTML tag is locked when the rows indicated by the middle scroll HTML tag reach the top of the screen.

When the locked rows at the top of the physical screen condition is present, the top row of the group of rows marked by the middle scroll HTML tag is locked at the top of the screen. FIGS. 5, 6 and 7 illustrate this action whereby the top row 30 of the group of rows marked by the middle scroll HTML tag reaches the bottom row 32 of the group of previously locked rows at the top of the screen.

FIG. 5 illustrates a screen 34 with three top rows locked. Rows 10, 11 and 12 have middle scroll tags. FIG. 6 illustrates the rows marked with middle scroll tags directly under the rows marked with the top scroll tag. When the next row is scrolled, the three rows marked with middle scroll tags move to the top of the screen and are locked. FIG. 7 illustrates the result of locking the three rows marked with the middle scroll tags.

If a bottom scroll HTML tag is present, the Web browser "locks" the rows indicated by the bottom of the screen when the Web browser first displays the Web file.

The condition of multiple sets of headings can be controlled by the browser which keeps track of these headings as they are scrolled. When the second set of headings with the "scroll" tag reaches the point where it is just under the first set of non-scrollable headings, the browser will position the second set of headings at the top of the browser and continue scrolling the file under the second set of headings. This process also works in reverse as the file is scrolled in the opposite direction.

In another aspect, the present invention is a system for operating a programmable computer comprising a storage medium and a set of operating instructions recorded on the storage medium to be executed by a computer capable of reading the storage medium. The instructions enabling the computer to read a data file with integrated scrollable and non-scrollable headings and write integrated headings and data to a computer screen. The headings are controlled using scroll tags in HTML.

Figure 8:
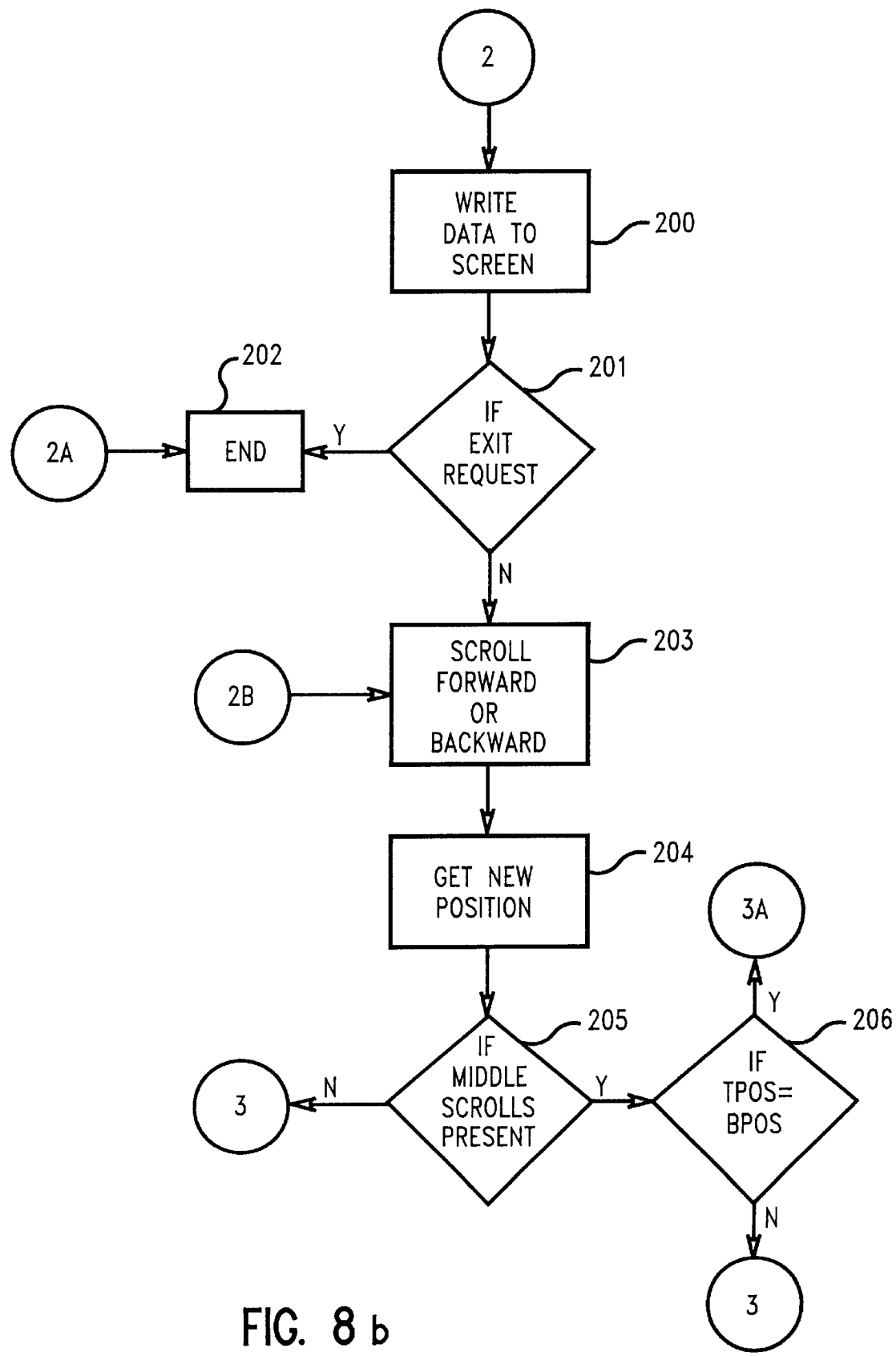
Figure 8C:
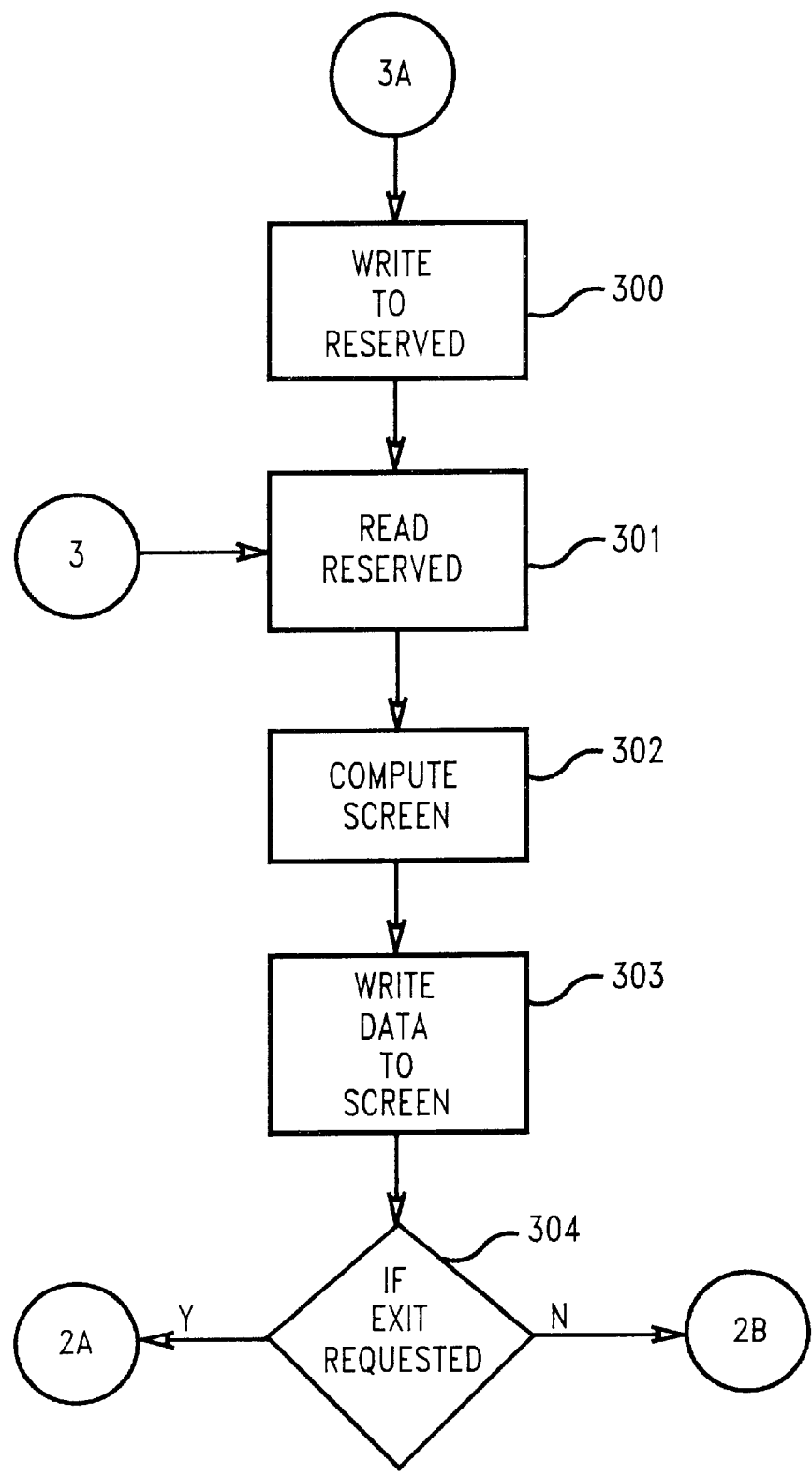

The following is a description of the steps of the example flow chart of FIG. 8:

| STEP NO. | DESCRIPTION |
|---|---|
| 100 | Start |
| 101 | Format all scroll tags |
| 102 | Is there is a top scroll HTML tag present in the HTML source file? FIG. 9 illustrates a sample HTML source files and FIG. 12 illustrates an HTML file with absolute row numbers. The top scroll lines are 1, 2 and 3. |
| 103 | If the answer to step 102 is yes, write the rows of data that will appear on the screen to the reserved table. Include the corresponding line numbers and the absolute row lines. For example, if there are three rows are to be viewed at the top of the screen, non-scrollable headings that are to be placed at the reserved, then, line numbers 1, 2 are non-scrollable. FIG. 11 illustrates an example of a sample reserved table 36. |
| 104 | If the answer to step 102 is no, determine if there is a bottom scroll HTML tag present in the HTML source file? FIG. 9 illustrates a sample HTML source file 38 and FIG. 12 illustrates a sample HTML file 40. The bottom scroll lines are 52 and 53. |
| 105 | Write the bottom rows of data to the reserved table. Also, write the line numbers and corresponding absolute row lines for these rows into the reserved table. For example, if the two rows non-scrollable headings that are to be at the bottom of the screen then, the last two numbers of the maximum number of rows that can be contained in the screen are written to the reserved table. If the screen can contain 20 rows of data, then, the numbers 19 and 20 are written to the reserved table together with the absolute row lines of 52 and 53. FIG. 12 illustrates an HTML source file 40 and FIG. 13 illustrates the reserved table 36. |
| 106 | Read the reserved table. FIG. 13 illustrates the lines of non-scrollable rows together with their line numbers which are read to the reserved table 36. |
| 107 | Compute the screen. The reserved lines, their reserved line numbers and the lines of the HTML file that are to be written to the screen are computed. For example, if there are three non-scrollable rows to be placed at the top of the screen forming a top heading and two non-scrollable rows to be placed at the bottom of the screen forming a bottom heading and the screen can contain a maximum of twenty rows, then, there will be 15 absolute row lines that will be placed between the bottom and top heading. In this example, absolute row lines 1, 2 and 3 are for the top non-scrollable rows, absolute row lines 4 to 18 from the HTML file are in the middle and two non-scrollable rows will be placed at the bottom of the screen forming a bottom heading. The two non-scrollable rows will be found at the bottom of the HTML file. The absolute row lines will be |

-continued

| STEP NO. | DESCRIPTION |
|---|---|
|  | written to the reserved table together with the line numbers and row data lines. FIG. 14 illustrates the computed screen 32 and FIG. 10 illustrates the reserved table 36 of the above described example. |
| 200 | Write data to the screen. The top and bottom non-scrollable lines will be written from the reserved table and the previous computed absolute line numbers 4 to 18 will point to the rows from the HTML file that are written to the screen. FIG. 14 illustrates a view of screen 42. |
| 201 | If exit request? |
| 202 | End if the answer to step 201 or step 304 is yes. |
| 203 | Scroll forward or backward if the answer to step 201 or step 304 is no. |
| 204 | Get the new position. Get the number of rows that have been scrolled and compute the absolute line number that is expected at the top of the screen. For example, as illustrated in FIG. 12, if 6 lines have been scrolled, then, new absolute line number will be placed at the top of the screen is line 24. |
| 205 | If middle scrolls are present? |
| 206 | If the answer to step 205 is yes, determine if tpos = bpos? This query asks: has the top row of the group of rows indicated by the middle scroll tag reached the bottom of the rows locked at the top of the screen? Since line 24 is the top row of a middle scroll tag and the top of the screen is just below the last line of a top scroll tag, then, tpos = bpos. FIG. 15 illustrates the screen view 42 and FIG. 16 illustrates the reserved table 36 view. |
| 300 | If the answer to step 206 is yes, write to the reserve table. Erase the previous top non-scrollable rows and their reserved line number from the reserve table. Write the non-scrollable rows indicate by the middle scroll tags and their reserved line numbers to the reserved table. In this case the middle non-scrollable rows will be placed at the top of the screen as illustrated in the reserved table 36 of FIG. 17. |
| 301 | If the answer to step 205 or 206 is no, read the reserved table. |
| 302 | Compute the screen. The reserved lines, their reserved line numbers and the lines of the HTML file that are to be written to the screen are computed. For example, if there are three non-scrollable rows to be placed at the top of the screen forming a top heading and two non-scrollable rows to be placed at the bottom of the screen forming a bottom heading and the screen can contain a maximum of twenty rows, then, there will be fifteen absolute row lines that will be placed between the two sets of non-scrollable rows. In this case, absolute row lines 1, 2 and 3 are for the top non-scrollable rows, absolute row lines x and y from the HTML file. Lines x and y are determined as a result of the previously recorded number of lines that were scrolled. These are followed by the two non-scrollable rows to be placed at the bottom of the screen. The two non-scrollable rows will be found at the bottom of the HTML file. |
| 303 | Write data to the screen. The top and bottom non-scrollable lines will be written from the reserved table and the previous computed absolute line numbers of x and y will point to the rows from the HTML file. FIG. 18 illustrates data written to the screen. |
| 304 | If exit requested? |

The present invention provides a system and method of visually organizing multiple information and headings on a computer screen of a Web browser which requires only one file for the HTML source code and does not require special coding in the HTML source file to tie the headings and data together. The heading displaying options are always accessible and the non-scrollable headings are always visible as the data is scrolled.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A web browser enhancement system for visually organizing multiple information and headings on a computer screen of a web browser comprising:

a web browser;

a data file viewable by said web browser, said data file comprising integrated top, bottom, and middle headings for identifying data;

scroll tags comprising hypertext markup language for locking said top headings in a top screen position;

scroll tags comprising hypertext markup language for locking said bottom headings in a bottom screen position; and scroll tags comprising hypertext markup language for movably positioning said middle heading in an upward or downward direction between said top and bottom headings and locking said middle heading adjacent to said top heading or said bottom heading when said middle heading is positioned adjacent said top or bottom heading, respectively.

2. A system as claimed in claim 1 where in said headings further comprise multiple middle headings.

3. A system as claimed in claim 1 wherein said means for locking said top headings, said means for locking said bottom headings and said means for movably positioning said middle heading are scroll tags comprising hypertext markup language.

4. A process for visually organizing multiple information and headings on a computer screen of a web browser comprising:

(a) providing a data file viewable by said web browser, said data file comprising integrated top, bottom, and middle headings for identifying data;

(b) locking said top headings in a top screen position using HTML scroll tags; said headings are scroll tags comprising hypertext markup language;

(c) locking said bottom headings in a bottom screen position using HTML scroll tags; and (d) positioning said middle heading between said top and bottom headings using HTML scroll tags.

5. A process as claimed in claim 4 further comprising:

(e) scrolling said data and said middle heading on the screen until said middle heading is positioned adjacent to said top heading; and (f) locking said middle heading adjacent to said top heading.

6. A process as claimed in claim 5 further comprising:

(g) replacing said top heading with said adjacent middle heading whereby creating a new top heading; and (h) locking said new top heading at the top of the screen using HTML tags.

7. A process as claimed in claim 6 further comprising:
(i) continuing to scroll data on the screen after locking said new top heading.

8. A process for visually organizing multiple information and headings on a computer screen of a web browser comprising:
(a) providing a first heading for identifying data;
(b) providing data viewable by said web browser associated with said first heading;
(c) writing said first heading and data to the screen of said web browser;
(d) locking said first heading in a selected position using HTML scroll tags; and
(e) scrolling said data on the screen for viewing said data adjacent to said first heading while said first heading remains locked.

9. A process as claimed in claim 8 further comprising:
(f) providing a second heading; and
(g) locking said second heading in a selected position using HTML tags.

10. A process as claimed in claim 9 further comprising:
(h) providing a third heading for identifying data;
(i) providing data associated with said third heading;
(j) positioning said third heading and data between said first heading and said second heading using HTML tags;
(k) scrolling said third heading to a position adjacent to said first heading; and
(l) replacing said first heading with said third heading.

11. A process as claimed in claim 10 further comprising:
(m) continuing to scroll data on the screen.

12. A process for visually organizing multiple information and headings on a computer screen of a web browser comprising:
(a) providing a data file viewable by said web browser with integrated scrollable and non-scrollable headings controlled using HTML scroll tags;
(b) reading said data file with a computing means;
(c) computing the screen including said headings; and
(d) writing said data and headings to the web browser screen.

13. The process as claimed in claim 12 further comprising the steps of:
(e) scrolling said scrollable heading to a position adjacent to one of said non-scrollable heading;
(f) replacing said adjacent non-scrollable heading with said scrollable heading; and
(g) locking said non-scrollable heading in place using HTML tags.

14. A process for visually organizing multiple information and headings on a computer screen of a web browser comprising:
(a) providing data viewable by said web browser with top, bottom and at least one middle integrated headings;
(b) formatting scroll tags associated with said headings;
(c) writing to a reserved table if a top HTML scroll tag is present,
(d) writing to said reserved table if a second HTML scroll tag is present;
(e) reading said reserved table;
(f) computing the web browser screen; and
(g) writing data to the web browser screen.

15. A process as claimed in claim 14 further comprising the steps of:
(h) scrolling in a downward direction;
(i) scrolling in an upward direction; and
(j) determining if a third scroll tag is present.

16. A process as claimed in claim 15 further comprising the steps of:
(k) scrolling data on the screen;
(l) computing an absolute line number displayed at the top of the screen;
(m) determining if at least one of said middle scroll tags is present;
(n) determining if the top row of said middle heading has reached the bottom row of the top heading;
(o) writing to said reserved table if the top row of said middle heading has reached the bottom row of the top heading;
(p) reading said reserved table;
(q) computing the screen; and
(r) writing to the screen.

17. A process as claimed in claim 14 wherein said scroll tags associated with said headings comprise hypertext markup language.

18. A process for visually organizing multiple information and headings on a computer screen of a web browser comprising:
(a) providing data viewable by said web browser, said data comprising integrated top, bottom and middle horizontal headings controlled using HTML scroll tags;
(b) reading said data with a computer capable of reading said data;
(c) writing said data and said top, bottom and middle headings to the screen;
(d) locking said top heading in a top screen position using said HTML scroll tags;
(e) locking said bottom heading in a bottom screen position using said HTML scroll tags; and
(f) movably positioning said middle heading between said top and bottom headings using said HTML scroll tags.

19. A process for visually organizing multiple information and headings on a computer screen of a web browser comprising:
(a) providing one data file viewable by said web browser with integrated headings including at least one scrollable middle heading;
(b) translating said data file and headings into a computed screen with the web browser;
(c) scrolling said middle heading to a top position on the computer screen;
(d) translating said data file and headings into a computed screen with the web browser; and
(e) locking said middle heading in the top screen position using HTML scroll tags.

20. A process as claimed in claim 19 further comprising the steps of:
(f) scrolling another middle heading to the top position on the computer screen;
(g) translating said data file and headings into a computed screen with the web browser; and
(h) locking said middle heading in the top screen position using HTML tags.

21. A system for operating a programmable computer comprising:

a storage medium; and a set of operating instructions recorded on said storage medium to be executed by a computer capable of reading said storage medium, said instructions enabling said computer to:
  (a) read a data file viewable by a web browser with integrated scrollable and non-scrollable headings; and
  (b) write integrated headings and data to a web browser computer screen using scroll tags comprising hypertext markup language.

22. A system as claimed in claim 20 wherein said integrated headings are controlled using scroll tags comprising hypertext markup language.

23. A program storage device readable by a machine, tangibly embodying a program of instructions executable by the machine to perform the method steps for visually organizing multiple information and headings on a computer screen of a web browser, said method steps comprising:
  (a) providing one data file viewable by said web browser with integrated headings including at least one scrollable middle heading;
  (b) translating said data file and headings into a web browser computer screen with the web browser;
  (c) scrolling said middle heading to a top position on the computer screen;
  (d) translating said data file and headings into a computed screen with the web browser; and
  (e) locking said middle heading in the top screen position using HTML scroll tags.

* * * * *

UNITED STATES PATENT AND TRADEMARK OFFICE
CERTIFICATE OF CORRECTION

PATENT NO. : 6,205,454 B1 Page 1 of 1
DATED : March 20, 2001
INVENTOR(S) : Norman J. Dauerer et al.

It is certified that error appears in the above-identified patent and that said Letters Patent is hereby corrected as shown below:

Column 1,
Line 46, after "provide" delete "a".

Column 6,
Line 28, step 103, after "rows" delete "are".

Column 8, claim 2,
Line 35, delete "where in" and substitute therefor -- wherein --.

Claim 4,
Line 50, delete "said headings are scroll tags comprising hypertext markup language;".

Signed and Sealed this

Eighteenth Day of December, 2001

*Attest:*

*Attesting Officer*

JAMES E. ROGAN
*Director of the United States Patent and Trademark Office*